United States Patent
Zhou et al.

(10) Patent No.: US 11,998,851 B2
(45) Date of Patent: *Jun. 4, 2024

(54) AUTOMATED COACHING FOR ONLINE GAMING

(71) Applicant: Electronic Arts Inc., Redwood City, CA (US)

(72) Inventors: Nina Zhou, Ann Arbor, MI (US); Lisa Renee Ryan, Union City, CA (US); Christopher Albert Pierse, Mountain View, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,284

(22) Filed: Jun. 3, 2022

(65) Prior Publication Data
US 2022/0288499 A1 Sep. 15, 2022

Related U.S. Application Data

(63) Continuation of application No. 16/838,743, filed on Apr. 2, 2020, now Pat. No. 11,351,464.

(51) Int. Cl.
*A63F 13/85* (2014.01)
*A63F 13/798* (2014.01)
*A63F 13/837* (2014.01)
*G06N 20/20* (2019.01)

(52) U.S. Cl.
CPC .......... *A63F 13/798* (2014.09); *A63F 13/837* (2014.09); *G06N 20/20* (2019.01)

(58) Field of Classification Search
None
See application file for complete search history.

(56) References Cited

U.S. PATENT DOCUMENTS

| | | | |
|---|---|---|---|
| 2017/0259177 A1* | 9/2017 | Aghdaie | G06N 7/01 |
| 2018/0165914 A1* | 6/2018 | Sternberg | G07F 17/3225 |
| 2019/0060759 A1* | 2/2019 | Krishnamurthy | A63F 13/67 |
| 2021/0086089 A1* | 3/2021 | Pardeshi | G06N 3/02 |
| 2021/0308587 A1 | 10/2021 | Zhou et al. | |

OTHER PUBLICATIONS

Office Action for U.S. Appl. No. 16/838,743, dated Aug. 30, 2021, Zhou, "Automated Coaching for Online Gaming ", 16 Pages.

* cited by examiner

*Primary Examiner* — Sunit Pandya
(74) *Attorney, Agent, or Firm* — Lee & Hayes, P.C.

(57) ABSTRACT

A game coaching system identifies gameplay data associated with online game players of an online game and determines, based at least in part on the gameplay data, a performance model to predict performance metric(s) of individual players. The performance model may be used to conduct a sensitivity analysis to determine which perturbations to individual parameters of gameplay data result in improvements to the performance metric(s) of a player. This sensitivity analysis may be used to identify action(s) to recommend to the player to improve his or her gameplay performance. The action(s) that are recommended to the player may be decided based at least in part on the predicted impact of those action(s) on player performance and/or the ease of implementing the action(s). The game coaching system may provide updated action recommendations to players to allow the player to improve his or her gameplay performance over time.

20 Claims, 11 Drawing Sheets

AUTOMATED COACHING FOR ONLINE GAMING

CROSS-REFERENCE TO RELATED APPLICATION(S)

This application is a continuation of and claims priority to U.S. application Ser. No. 16/838,743, filed on Apr. 2, 2020 and entitled "AUTOMATED COACHING FOR ONLINE GAMING," issuing as U.S. Pat. No. 11,351,464 on Jun. 7, 2022, the entirety of which is incorporated herein by reference.

BACKGROUND

Online gaming allows for players to play a variety of electronic and/or video games with each other via network connectivity, such as via the Internet. Players often play games in which they may lack skill. Additionally, with some games, it may be difficult to become more skilled over time. When players are not skilled at a particular online game or if they are not able to improve their skills sufficiently over time, they may experience diminished enjoyment with the online game. A player who is unable to improve at an online game may have a poor quality of engagement with the online game and may be more prone to disengage from playing that online game.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
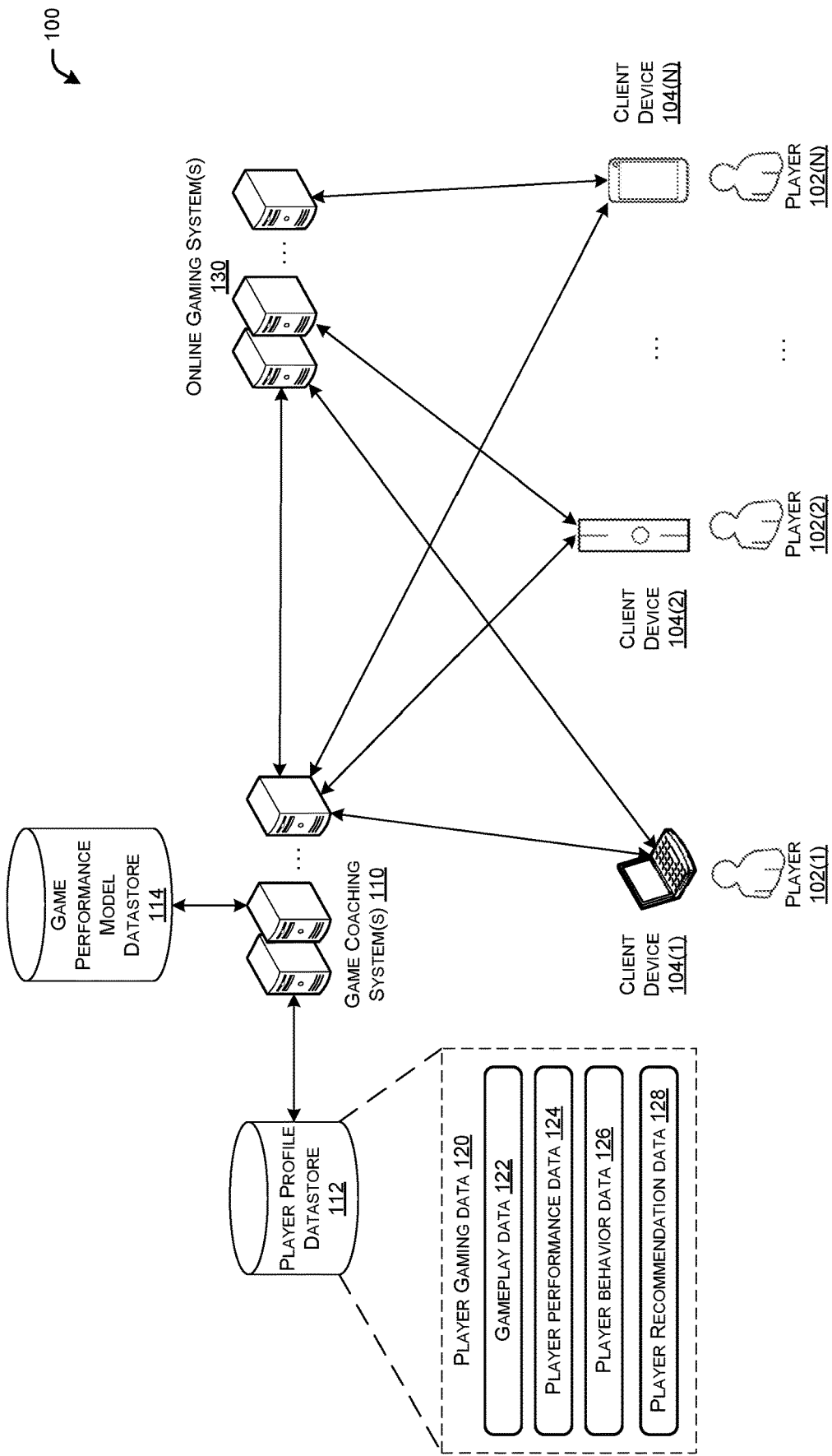
FIG. 1 illustrates a schematic diagram of an example environment with online gaming system(s) and game coaching system(s) to provide automated coaching to player(s) for online gaming, in accordance with example embodiments of the disclosure.

Example embodiments of this disclosure describes methods, apparatuses, computer-readable media, and system(s) for coaching online game players to improve their gaming skills in a particular online game. An online game player may become disengaged from an online game if he or she is not able to improve his or her performance in the online game over time. With the complexity of modern online games, it may be difficult for players to know how to improve their online gaming performance. According to example embodiments of the disclosure, players may be provided with recommendations to improve their online gaming performance. These recommendations may be specific actions that one can take when playing the online game.

According to example embodiments of the disclosure, game coaching system(s) may be able to generate a performance model associated with the gameplay of a certain online game. This performance model may be generated using a collection of player gaming data associated with a plurality of players who have played the online game for which the performance model is to be generated. The player gaming data may include one or more performance metrics (e.g., damage per match score, matchmaking rating, etc.), as well as one or more gameplay data associated with individual ones of the players. The gameplay data may include various characteristics of a player's gameplay, such as, in the context of a battle royale, first person shooter-type game, the amount of use of certain types of weapons, level of walking/running, levels of climbing, levels of communications with other players, accuracy of weapons use, etc. It will be appreciated that other online games and/or genres of online games may have different gameplay data types. The gameplay data, as described herein, may include numerical and/or descriptive characteristics of a player's gameplay in one or many sessions of an online game. In other words, the gameplay data may include descriptive statistics and/or summaries of the aspects of a player's gameplay over a period of time and/or number of sessions.

The game coaching system(s) may generate the performance model using any suitable modeling technique, such as any suitable machine learning algorithms, regressions models, heuristics, or the like. In some cases, the game coaching system(s) may train, using the gameplay data and the player performance data, a random forest model to predict performance metric(s) based on gameplay data 122. Although discussed herein in the context of a random forest model, the performance model may be any one or combination of decision tree models, gaussian tree models, Bernoulli models, linear regression models, neural network models, Bayesian network models, any variety of heuristics (e.g., genetic algorithms, swarm algorithms, etc.), combinations thereof, or the like. After the performance model is generated, the performance model may be deployed for the purposes of predicting player performance improvements resulting from a player's changes in actions during gameplay.

In some cases, the performance model may be trained on a first subset of training data (e.g., gameplay data of players and corresponding player performance data) and a second subset of the training data may be used to determine the predictive capability of the model. In other words, the model may be evaluated using the second subset of training data using any suitable metric (e.g., mean-squared error (MSE)), and if the performance model is considered to sufficiently predictive of the associated performance metric, then the performance model may be deployed. However, if the model does not meet a threshold level of performance (e.g., MSE is above a threshold level) then the performance model may be further trained using additional training data and/or different parameters of the training model. When the performance model is predicting the performance metric to an acceptable level of accuracy and/or precision, the performance model may be deployed for determining actions that would aid a player in improving his or her gameplay performance.

In example embodiments, the game coaching system(s) may use the performance model, as described herein, to perform an analysis of how a player can improve his or her gameplay performance, as measured by his or her player performance data. For example, the game coaching system(s) may test a variety of hypothetical changes in a player's gameplay data to determine which changes may result in improvements to that player's gameplay performance. This analysis may include a sensitivity analysis where various gameplay data associated with a player may be perturbed by a predetermined and/or variable amount to identify the effect of that perturbation on the player's expected performance. For example, if a player throws 75 grenades during gameplay of a certain online game, the game coaching system(s) may determine what the effect of the player throwing 72 grenades would be on his or her damage per match score, as well as the effect of the player throwing 78 grenades on his or her damage per match score. Although a +/−3 grenades thrown perturbation is used in this example sensitivity analysis of the number of grenades thrown, it should be understood that any suitable magnitude of perturbation may be used with any quantifiable gameplay data to determine its impact on one or more performance metric. Additionally, although the perturbation, in this example, is symmetric, where the perturbation for the increase in the number of grenades thrown (e.g., +3 grenades) is the same as perturbation for the decrease in the number of grenades thrown (e.g., −3 grenades), it should be understood that according to example embodiments of the disclosure, the perturbations to the high side and the perturbations to the low side may be non-symmetric. Continuing with the example, if it is determined that throwing three extra grenades result in an improvement in the player's damage per match score, then the game coaching system(s) may recommend to the player to throw more grenades during gameplay. This action recommendation may be displayed to the player via his or her client device with which he or she plays the online game.

In example embodiments of the disclosure, the impact on performance of changing a number of gameplay data types of a player may be determined. From this type of sensitivity analysis, the most impactful changes of the gameplay data may be translated to actions that the player can take to improve performance. For example, this analysis can determine that the player may improve his or damage per match score by 30 points by throwing 2 more grenades, but only 14 points by running 5% more. If only one recommendation is to be made to the player, the recommendation may be to throw more grenades, rather than to run more during gameplay. In other cases, the game coaching system(s) may identify several different actions that could be taken to improve a player's performance and recommend the three most impactful ones of those several actions. Indeed, the game coaching system(s) may identify any suitable number of actions to help a player's gameplay performance and provide any suitable subset of those actions as recommendations to the player.

According to example embodiments of the disclosure, recommendations of actions to improve one's performance may be made to players considering both the impact of those actions, as well as the ease of implementation of those actions. In other words, if the game coaching system(s) identify a first action that may have a greater positive impact on performance than a second action, but the first action may be more difficult to implement than the second action, then the game coaching system(s) may prioritize the recommendation of the second action even though its impact to performance improvement may be less than the first action. For example, the game coaching system(s) may determine that improving accuracy of grenades by 5% would result in a 45 point improvement in a player's damage per match score and that throwing 2 more grenades would result in a 35 point improvement in that player's damage per match score, the game coaching system(s) may prioritize the recommendation of throwing more grenades than improving accuracy, since it may be easier to throw more grenades than to improve a skill, like improved accuracy. Thus, each action may have an ease of implementation metric associated with it for the purposes of determining which actions to recommend to a player to improve his or her gameplay.

The game coaching system(s), in example embodiments, may also be able to provide revised action recommendations to a player over time. For example, if a player plays an online game and is provided with actions to perform to improve his or her gameplay, by the mechanisms disclosed herein, the game coaching system(s) may perform another analysis of that player's gameplay at some point in the future to provide additional recommendations for improving performance. In some cases, if a player performs some of the initial recommended actions, then at the later time, other actions may be recommended to the player, based on the performance improvement analysis performed at the later time. In these cases, the game coaching system(s) may use gameplay data associated with the player during a time period after when the initial recommendations were made to perform the second gameplay improvement analysis.

In still further example embodiments, the game coaching system(s) may be able to monitor a player's behavior (e.g., engagement, number of hours played in a week, number of days played in a month, number of hours played per session, etc.). This behavior data may be used by the game coaching system(s) to provide feedback as to whether providing action recommendations to improve gameplay has an effect on player engagement. In some cases, the game coaching system(s) may perform an A/B test (e.g., split/bin test) to determine the effectiveness of providing action recommendations to players. For example, action recommendations may be provided to a first group of players and not to a second group of players and the game coaching system(s) may determine if there are any and/or a magnitude of difference across any number of engagement metrics between the first group and the second group. The game coaching system(s) may also be configured to perform a longitudinal study on players to whom action recommendations are provided. For example, a particular player or a group of players' engagement during a time period prior to providing the player or players with action recommendations may be compared to the same player or group of players' engagement after providing him/her/them with action recommendations.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with online gaming system(s) 130 and game coaching system(s) 110 to provide automated coaching to player(s) 102(1), 102(2), . . . 102(N) for online gaming, in accordance with example embodiments of the disclosure. The player(s) 102(1), 102(2), . . . 102(N), hereinafter referred to individually or collectively as player(s) 102, may interact with respective game client device(s) 104(1), 104(2), . . . 104(N), hereinafter referred to individually or collectively as game client device(s) 104 to play online game(s) hosted by online gaming system(s) 130.

The player(s) 102 may be either streaming players 102 or non-streaming players 102. The non-streaming players may play using client devices 104 that locally render the game to respective players 102. For streaming players 102 rendered game content may be provided to client devices 104 of the players 102 by the online gaming system(s) 130 and/or associated streaming systems. The mechanisms as described herein may be applied to either or both streaming and/or non-streaming players 102.

The game client devices 104 may be configured to render content associated with the online game to respective players 102. This content may include video, audio, haptic, combinations thereof, or the like content components. The game client device(s) 104 may receive game state information from the one or more online gaming system(s) 130 that may host the online game played by the player(s) 102 of environment 100. The game client device(s) 104 may use the game state information to render current events of the online game as content. The game state information may be received repeatedly and/or continuously and/or as events of the online game transpire. The game state information may be based at least in part on the interactions that each of the player(s) 102 have via their input device(s) associated with their client device(s) 104 responsive to events of the online game hosted by the online gaming system(s) 130.

As events transpire in the online game, the online gaming system(s) 130 may update game state information and send that game state information to the game client device(s) 104. For example, if the players 102 are playing an online soccer game, and the player 102 playing one of the goalies move in a particular direction, then that movement and/or goalie location may be represented in the game state information that may be sent to each of the game client device(s) 104 for rendering the event of the goalie moving in the particular direction. In this way, the content of the online game is repeatedly updated throughout game play. When the game client device(s) 104 receive the game state information from the online gaming system(s) 130, the game client device(s) 104 may render updated content associated with the online game to its respective player 102. This updated content may embody events that may have transpired since the previous state of the game (e.g., the movement of the goalie).

The game client device(s) 104 may accept input from respective players 102 via respective input device(s) of the client device 104, such as joysticks, touch screens, gamepads, or the like. The input from the players 102 may be responsive to events in the online game. For example, in an online basketball game, if a player 102 sees an event in the rendered content, such as an opposing team's guard blocking the paint, the player 102 may provide input to his/her client device 104 to try to shoot a three-pointer. Intended action by the player 102, as captured via input devices of the client devices 104 may be sent to the online gaming system(s) 130.

The game client device(s) 130 may be any suitable device, including, but not limited to a Sony Playstation® line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to interact with the online gaming system(s) 130 and render game content based at least in part on game state information received from the online gaming system(s) 130. Additionally, the client device(s) 104 may send indications of player input to the online gaming system(s) 130. Game state information and player input information may be shared between the client device(s) 104 and the online gaming system(s) 130 using any suitable mechanism, such as application program interfaces (APIs).

The online gaming system(s) 130 may receive inputs from various players 102 and update the state of the online game based thereon. As the state of the online game is updated, the state may be sent the various client system(s) 104 for rendering online game content to players 102. In this way, the online gaming system(s) 130 host the online game. As described herein, in some cases, the online gaming system(s) 130 and/or associated system(s), such as a streaming system (not shown), may provide streaming content to one or more of the client devices 104, when the associated players 102 play in streaming mode. The streaming players 102 may experience (e.g., view, hear, feel, etc.) the content associated with the online game on their client devices 104 based at least in part on streaming content as received from the online gaming system(s) 130.

The game coaching system(s) 110 may receive, manage, and/or access information about the players 102 who play online game(s). The player related data may be stored and/or accessed by the game coaching system(s) 110 in a player profile datastore 112. The player 102 related data may be stored as player gaming data 120 corresponding to respective players 102, and may include information such as any variety of gaming data, such as gameplay data 122, player performance data 124, player behavior data 126, player recommendation data 128, combinations thereof, or the like. According to example embodiments, the parameters and values, as stored and available in the player gaming data 120 may be used to determine a performance model that predicts a player's performance based on a variety of gameplay data 122 of an online game, as well as actions that would improve a player's performance on the online game. Thus, the game coaching system(s) 110 provide recommendations of actions to players 102 via their respective client devices 104, as described herein, using the player gaming data 120, as stored in the player profile datastore 112.

The gameplay data 122 of a player gaming data 120 may indicate a variety of gameplay related information about the corresponding player 102. For example, the gameplay data 122 may include data related to a particular online game are for which action recommendations may be made to the player 102 to improve the player's performance. The gameplay data 122 of a player 102 may indicate various metrics associated with how the player 102 plays the online game for which recommendations are to be made. This gameplay data 122 may be received from the online gaming system(s) 130 and/or determined at the game coaching system(s) 110 based at least in part on data received from the online gaming system(s) 130.

The game play data 122 may indicate data associated with how a player 102 plays the online game for which action recommendations are to be made for improvement and/or what the player does during gameplay. For example, for a first-person shooter/battle royale style game (e.g., APEX LEGENDS by ELECTRONIC ARTS), the various aspects of what the player 102 does during gameplay may be tracked over different periods of time. The frequency of use of particular weapons may be tracked (e.g., how many grenades were used, how many shots were fired, etc.) over the last game or any grouping of games and/or time periods of gameplay. Additionally, movement may be tracked (e.g., percentage of time running, percentage of time walking, levels of climbing/descent, etc.). Further still, team/cooperation factors may be tracked (e.g., number of times assisting other players, pinging other players for recovery and/or help, frequency of communications, toxic communications, over-pinging for help, etc.).

Although described herein in the context of a battle royale style game, it will be appreciated that the techniques described herein may be applied to any style of online games and individual online games and/or types/genres of games may use different gameplay data 122 for the purposes of performance model building and/or providing recommended actions to individual players 102. For example, in an American football online game, the types of gameplay data 122 that may be tracked and used for providing recommendations to players 102 may include number of passes attempted, number of rush plays attempted, number of fourth down attempts, average number of players rushing the quarterback, proximity of receiver coverage, etc. In other words, any of the aforementioned parameters, as determined from online game play for an ensemble of players 102, may be used to generate a performance model and then those parameters pertaining to an individual player 102 may be used, in conjunction with the performance model, to make action recommendations to the player 102. For example, such action recommendations may be to attempt more rush plays and fewer pass plays, use an additional player to protect the quarterback, attempt fewer long field goals, etc.

As yet a further example of gameplay data 122, consider a mixed martial arts online game. The gameplay data 122 that may be tracked by the game coaching system(s) 110 in conjunction with the online gaming system(s) 130 may include number of punches attempted, number of kicks attempted, proximity when punching, proximity when kicking, percentage of body hits, percentage of face hits, percentage blocking, etc. Again, the game coaching system(s) 110 may be configured to use any of these parameters, as determined from online game play for an ensemble of players 102, to generate a performance model and then those parameters pertaining to an individual player 102, in conjunction with the performance model, to make action recommendations to the player. For example, such action recommendations may be to attempt more body blows, rather than face hits, spend more time blocking, move away from the opponent when kicking, etc.

The game coaching system(s) 110 may be configured to store and then later access information about individual players, such as from the player's player gaming data 120 to generate performance model(s) and/or recommendations for individual players 102 to improve their gameplay. In some cases, the game coaching system(s) 110 may access an ensemble of gameplay data 122 of a plurality of players 102 for the purposes of generating performance model(s) using the gameplay data 122. In other cases, the game coaching system(s) 110 may be configured to access gameplay data 122 corresponding to an individual player 102 for the purposes of determining one or more actions to recommend to the player 102 to improve his or her gameplay performance. It should be understood that the gameplay data 122 may include numerical and/or descriptive characteristics of a player's gameplay in one or many sessions of a corresponding online game. In other words, the gameplay data 122 may include descriptive statistics and/or summaries of the aspects of a player's gameplay over a period of time and/or number of sessions.

As described herein, the gameplay data 122 may be used to generate one or more performance model(s) to model one or more performance metric(s) that may be stored as player performance data 124. These performance metrics may include any suitable metric that indicates the performance of a player 102, and such metrics may not be limited to a final score. As an example, in the context of a battle royale style game, a performance metric may include a damage per match score. Thus, in this case, the performance model for this type of online game may use gameplay data 122 to predict the damage per match score. Other types of player performance data 124 may include scores, levels played, total time played, number of lives attained, number of extended plays, skill levels attained, wins, wins minus losses, score delta (score minus opposition's score), combinations thereof, or the like. The player performance data 124 for a plurality of players 102 of an online game may be used, in conjunction with the gameplay data 122 of those players 102, to generate a performance model to predict the performance data 124 from the gameplay data 122. When the performance model is used to recommend actions to individual players 102, those actions may be to help the players 102 improve their performance metrics, as embodied in the player performance data 124. The performance model, after being generated may be stored, managed, updated, and/or accessed in a game performance model datastore 114.

The player behavior data 126 may indicate a player's engagement with the online game for which recommendations are to be made. Engagement may be assessed as how many times or how often a player 102 plays the online game over a given period of time. For example, the player behavior data 126 associated with a particular player 102 may indicate the number of hours that player 102 played the online game over the past month or over the past week, or how many sessions he or she played over a two week period, etc. The game coaching system(s) 110 may determine the relative level of a player's engagement by comparing his or her player behavior data 126 to the player behavior data 126 of other players 102. Additionally, the game coaching system(s) 110 may determine changes in a particular player's level of engagement based at least in part on changes in the player's player behavior data 126 over time. For example, a player may have played a particular online game for 5 hours on one week and then for 8 hours in the subsequent week. This may indicate that the player's level of engagement has increased from the first week to the subsequent week.

The player recommendation data 128 may indicate action recommendations that were made to a player 102. These action recommendations may be stored along with a timestamp. The game coaching system(s) 110 may be configured to store a record of actions recommended to individual players 102 over time. The game coaching system(s) 110 may also be configured to access the player recommendation data 128 for a player 102 and determine if that player had implemented some of the recommended actions made to him or her.

Figure 2:
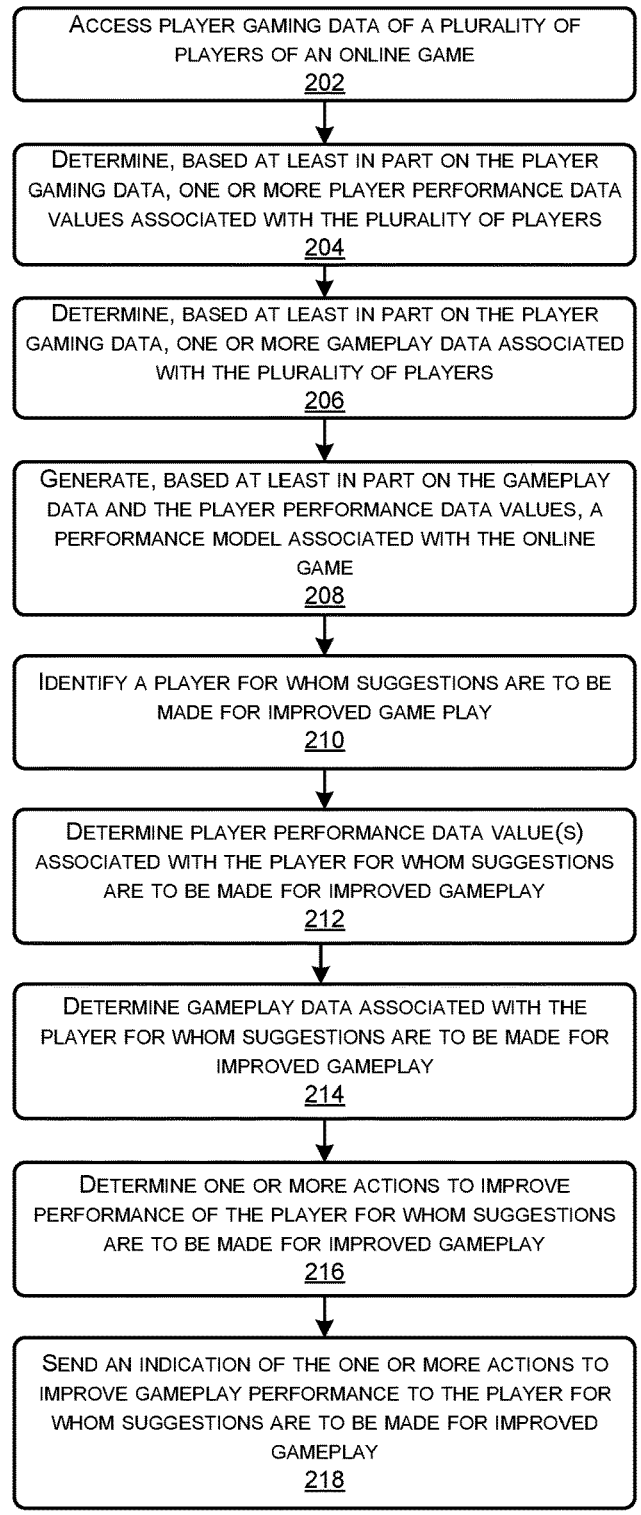
FIG. 2 illustrates a flow diagram of an example method to provide a player with recommendations to perform one or more actions to improve his or her online gaming performance, in accordance with example embodiments of the disclosure.

FIG. 2 illustrates a flow diagram of an example method 200 to provide a player 102 with recommendations to perform one or more actions to improve his or her online gaming performance, in accordance with example embodiments of the disclosure. The method 200 may be performed by the game coaching system(s) 110, in cooperation with one or more entities of environment 100.

At block 202, player gaming data associated with an online game of a plurality of players may be accessed. This player gaming data 120 may be accessed from the player profile datastore 112 by the game coaching system(s) 110. At block 204, one or more player performance data may be determined based at least in part on the player gaming data. In example embodiments, the player performance data 124 for the plurality of players 102 may be stored as part of their player gaming data 120. The player performance data 124 may be accessed by the game coaching system(s) 110 from the player profile datastore 112. At block 206, one or more gameplay data may be determined for the plurality of players based at least in part on the player gaming data. In example embodiments, the gameplay data 122 for the plurality of players 102 may be stored as part of their player gaming data 120. The gameplay data 122 may be accessed by the game coaching system(s) 110 from the player profile datastore 112.

At block 208, a performance model associated with the online game may be generated based at least in part on the gameplay data and the player performance data. The game coaching system(s) 110 may generate the performance model using any suitable modeling technique, such as any suitable machine learning algorithms, regressions models, heuristics, or the like. In some example embodiments, the game coaching system(s) 110 may train, using the gameplay data 122 and the player performance data 126, a random forest model to predict performance metric(s) based on the gameplay data 122. Although discussed herein in the context of a random forest model, the performance model may be any one or combination of decision tree models, gaussian tree models, Bernoulli models, linear regression models, neural network models, Bayesian network models, any variety of heuristics (e.g., genetic algorithms, swarm algorithms, etc.), combinations thereof, or the like.

The game coaching system(s) 110 may identify parameters for training the performance model. For example, for a random forest model, parameters, such as the number of trees, maximum number of features per tree, maximum number of nodes per tree, maximum number of terminal nodes, etc., may be determined. In some example embodiments, the parameters for training the performance model may be received from an operator who guides the training of the performance model. In some cases, the training the performance model may be supervised. In other cases, the training may be unsupervised or a combination of supervised and unsupervised.

In some cases, the performance model may be trained on a first subset of training data (e.g., gameplay data 122 of the plurality of players 102 and corresponding player performance data 126) and a second subset of the training data may be used to determine the predictive capability of the model. In example embodiments, the performance model may be evaluated using the second subset of training data using any suitable metric, such as MSE, and if the performance model is considered to sufficiently predictive of the associated performance metric, then the performance model may be stored in the game performance model datastore 114 and/or deployed. However, if the model does not meet a threshold level of performance, such as if the MSE level is greater than a corresponding threshold level, then the performance model may be further trained using additional training data and/or using different parameters of the training model. When the performance model is predicting the performance metric to an acceptable level of accuracy and/or precision, the performance model may be stored in the game performance model datastore 114 and/or deployed for determining actions that would aid a player in improving his or her gameplay performance.

At block 210, a player for whom suggestions are to be made for improved gameplay may be identified. In some cases, this player 102, who is identified as potentially benefiting from action recommendations for improved gameplay, may be at a beginner or intermediate level, in example embodiments. In other example embodiments, the player 102 identified as potentially benefiting from action recommendations for improved gameplay may be a player 102 whose performance, as indicated by their player performance data 124, may have stagnated over time and/or recently. The player's proficiency level and/or performance changes over time may be determined from the player's player performance data 124, as can be accessed from the player profile datastore 112.

At block 212, player performance data associated with the player for whom suggestions are to be made for improved gameplay may be determined. As discussed herein, this player performance data 124 of the player 102 may be accessed from the player gaming data 120, as stored in the player profile datastore 112. At block 214, gameplay data associated with the player for whom suggestions are to be made for improved gameplay may be determined. As discussed herein, this gameplay data 122 of the player 102 may be accessed from the player gaming data 120, as stored in the player profile datastore 112.

At block 216, one or more actions to improve performance of the player for whom suggestions are to be made for gameplay may be determined. In example embodiments, a sensitivity analysis may be performed by perturbing individual ones of the parameters of the gameplay data 122 to predict, using the performance model, the effect of the perturbation. Those perturbations that are predicted to improve the player's performance may be identified. The corresponding actions of the perturbations that are predicted to improve gameplay performance may be identified.

At block 218, an indication of the one or more actions to improve performance may be sent to the player for whom suggestions are to be made for improved gameplay. In example embodiments, indications of the one or more actions may be sent by the game coaching system(s) 110 to the client device 104 associated with the player 102 for whom these action suggestions are made. The player's client device 104 may display the recommended one or more actions to the player 102.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
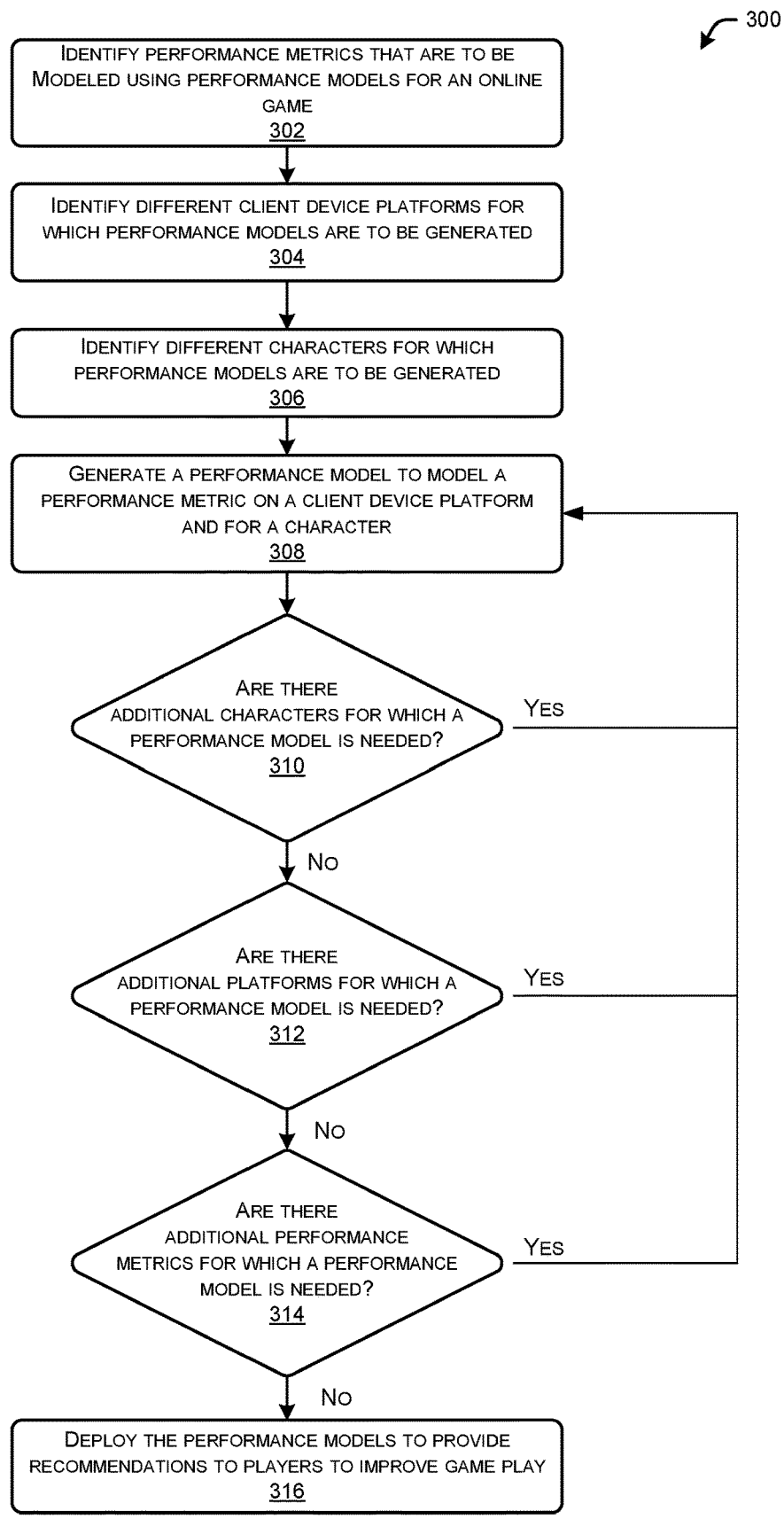
FIG. 3 illustrates a flow diagram of an example method by which various performance models corresponding to different characters, platforms, and/or performance metrics is generated, in accordance with example embodiments of the disclosure.

FIG. 3 illustrates a flow diagram of an example method 300 by which a to generate various performance models corresponding to different characters, platforms, and/or performance metrics, in accordance with example embodiments of the disclosure. The method 300 may be performed by the game coaching system(s) 110, in cooperation with one or more entities of environment 100.

At block 302, different performance metrics for an online game that is to be modeled using a performance model may be determined. As discussed herein, there may be a performance model generated for each of the different performance metrics that are to be modeled. At block 304, different client device platforms for which performance models are to be generated may be identified. As discussed herein, there may be a performance model generated for each of the different client device types. At block 306, different characters for which performance models are to be generated may be identified. As discussed herein, there may be a performance model generated for each of the different characters or avatars in the online game. At block 308, a performance model for a particular performance metric, a particular client device type, and a particular character may be generated. In example embodiments, this performance model may be generated by some or all of the processes of method 400 of FIG. 4, as described herein.

At block 310, it may be determined if there are additional characters for which a performance model is needed. If it is determined that there are additional characters for which a performance model is to be determined, then the method 300 may return to block 308 to generate an additional performance model to the additional character. If, however, it is determined that there are no additional characters for which a performance model is needed, then the method 300 may proceed to block 312, where it may be determined if there are additional client device platforms for which a performance model is needed. If it is determined that there is an additional client device platform for which a performance model is to be determined, then the method 300 may return to block 308 to generate an additional performance model corresponding to the additional client device type. If, however, it is determined that there is no additional client device type for which a performance model is needed, then the method 300 may proceed to block 314, where it may be determined if there are additional performance metrics for which a performance model is needed. If it is determined that there is an additional performance metric for which a performance model is to be determined, then the method 300 may return to block 308 to generate an additional performance model corresponding to the additional performance metric. If, however, it is determined that there are no additional performance metric for which a performance model is needed, then the method 300 may proceed to block 316, where each of the generated performance models may be deployed to provide recommendations to players to improve their gameplay. The game coaching system(s) 110 may store each of the performance models in the game performance model datastore 114 associated with their respective client device types, performance metrics, and/or characters for retrieval later on to perform sensitivity analysis.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
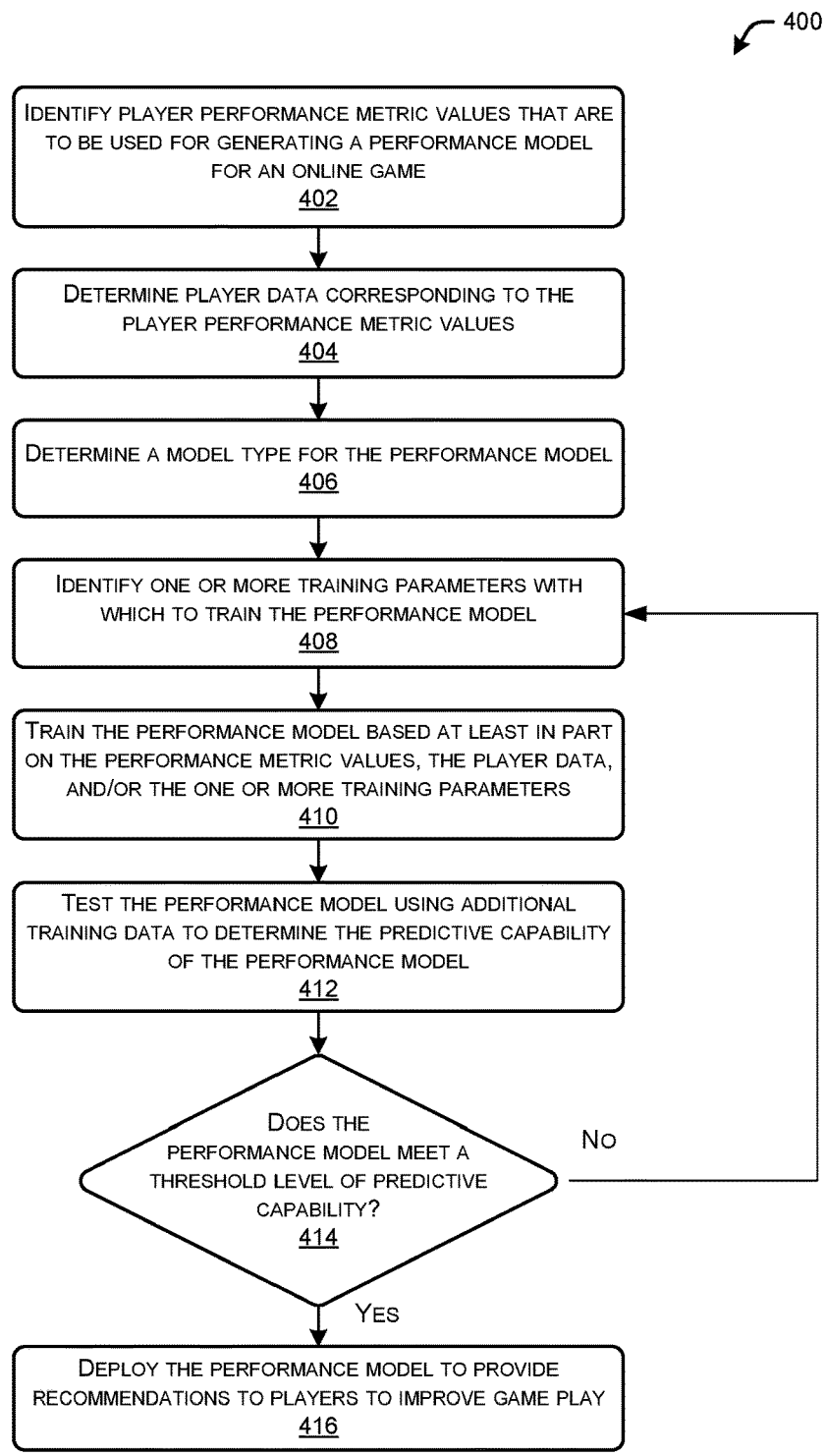
FIG. 4 illustrates a flow diagram of an example method by which a performance model is generated and deployed, in accordance with example embodiments of the disclosure.

FIG. 4 illustrates a flow diagram of an example method by which a performance model is generated and deployed, in accordance with example embodiments of the disclosure. The method 400 may be performed by the game coaching system(s) 110, in cooperation with one or more entities of environment 100. In example embodiments, the method 400 may be an implementation of the processes of block 308 of FIG. 3. In other words, the method 400 may be implemented for each character, client device type, and/or performance metric. Thus, in some cases, the method 400 may be used to generate a performance model corresponding to each character within an online game, types of client devices, and/or performance metrics.

At block 402, player performance metric values that are to be used for generating a performance model for an online game may be identified. These player performance metric values may be retrieved from the player profile datastore 112, as player performance data 124, by the game coaching system(s) 110. The player performance metric values may pertain to a plurality of players 102 who have played the online game. In some example embodiments, to make the performance model generated more targeted, particular player's performance metric values may be used, such as players who are beginners and/or intermediate level players 102. Additionally, in some cases, the performance metric values may be associated with a particular character/avatar in a particular online game, a particular client device type, and/or for a specific performance metric.

At block 404, gameplay data corresponding to the player performance metric values may be determined. This gameplay data 122 may also be retrieved by the game coaching system(s) 110 from the player profile datastore 112. The combination of the gameplay data 122 and corresponding player performance metric values may serve as training data for training the performance model. As described herein, in some cases, the performance metric values may be for a particular character/avatar in a particular online game, a particular client device type, and/or for a specific performance metric.

At block 406, a model type for the performance model may be determined. The model type may be selected from any suitable type of model. The types of models may include a random forest model, decision tree models, gaussian tree models, Bernoulli models, linear regression models, neural network models, Bayesian network models, any variety of heuristics (e.g., genetic algorithms, swarm algorithms, etc.), combinations thereof, or the like. In some example embodiments, the performance model may be a model type where the inputs of the gameplay data 122 parameters are not abstracted. In example embodiments, the selected model type may be a random forest model.

At block 408, one or more training parameters according to which to train the performance model may be identified. For a random forest model, the training parameters may include the number of trees, maximum number of features per tree, maximum number of nodes per tree, maximum number of terminal nodes, etc., may be determined. Other model types may include other training or modeling parameters. In example embodiments, the one or more training parameters may be provided to the game coaching system(s) 110 by an operator. At block 410, the performance model may be trained based at least in part on the performance metric values, the gameplay data, and/or the one or more training parameters.

At block 412, the performance model may be tested using additional training data to determine the predictive capability of the performance model. In some cases, the additional training data may have been partitioned off from the original training data as identified by the processes of blocks 402 and 404. Any suitable type of test may be performed to determine the predictive capability of the newly generated performance model. For example, MSE metric of the performance model may be determined.

At block 414, it may be determined if the performance model meets a threshold level of predictive capability. In some cases, the MSE may be compared to a threshold level to determine if the performance model meets the threshold level of predictive capability. If it is determined that the performance model meets a threshold level of predictive capability, then the method 400 proceeds to block 416, where the performance model may be stored in the game performance model datastore and/or deployed to provide recommendations to players to improve their gameplay. However, if it is determined that the performance does not meet a threshold level of predictive capability, then the method may return to block 408 to retrain the performance model using different training parameters and/or additional training data (e.g., player performance data 124, gameplay data 122, etc.). The game coaching system(s) 110 may store the performance model in the game performance model datastore 114, when finalized, such as in association with the particular character/avatar, the particular client device type, and/or for the specific performance metric with which the performance model is associated.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
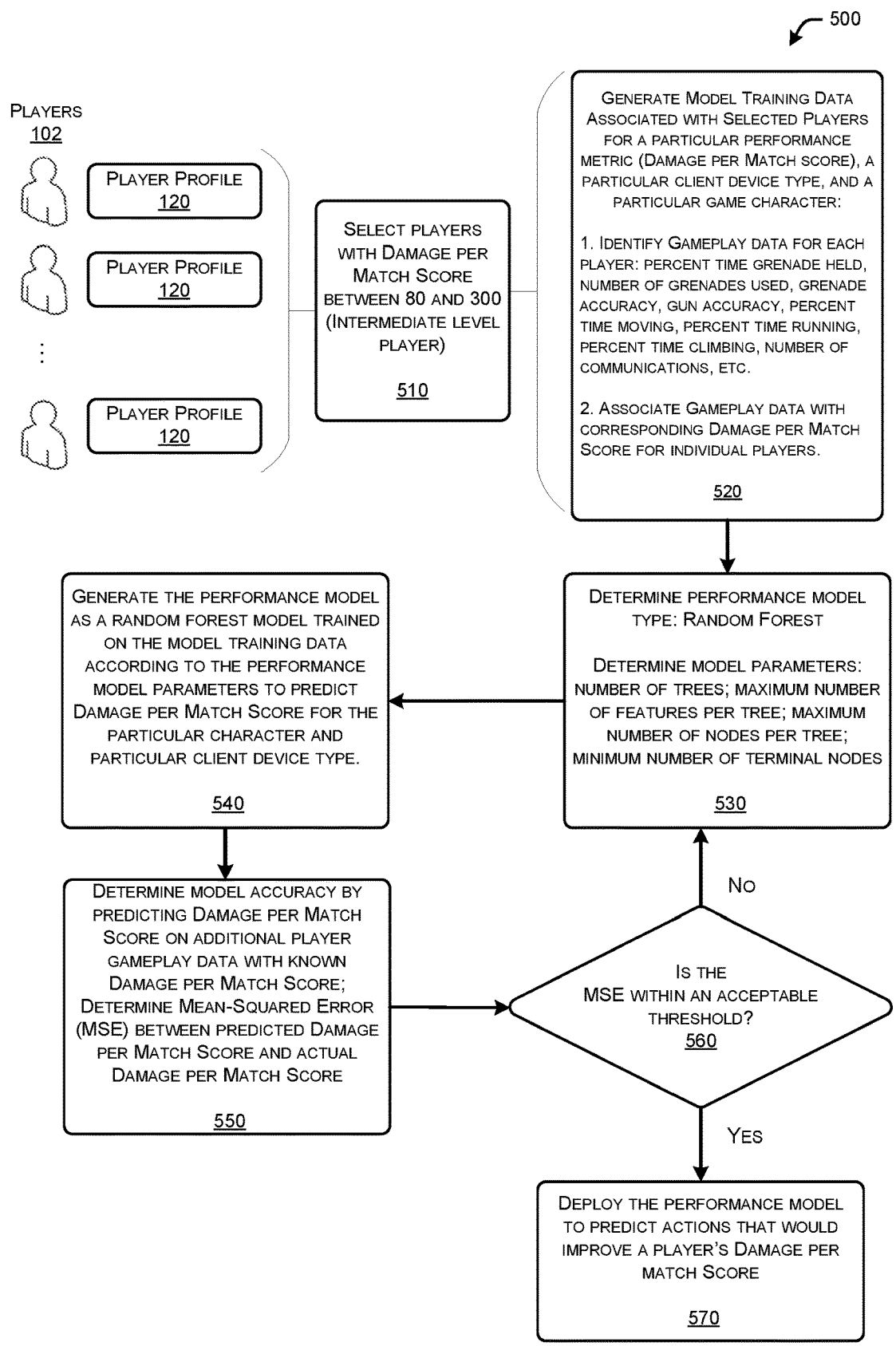
FIG. 5 illustrates a schematic diagram of an example environment by which a performance model is generated and deployed, in accordance with example embodiments of the disclosure.

FIG. 5 illustrates a schematic diagram of an example environment 500 by which a performance model is generated and deployed, in accordance with example embodiments of the disclosure. At block 510, the game coaching system(s) 110 may review a variety of player gaming data 120 corresponding to respective players 102 to identify players 102 who are at an intermediate level. The performance model to be generated may be targeted to the intermediate level to help players at the intermediate level improve their gameplay. In this case, the intermediate level may correspond to a performance metric in the form of damage per match score of between 80 and 300. As a result, the player gaming data 120 for players 102 with damage per match scores of between 80 and 300 may be used to generate the performance model. Additionally, the players 102 may be selected for contributing player gaming data 120 that pertain to a particular character/avatar and/or a particular client device type for which the performance model is to be generated.

At block 520, gameplay data 122 corresponding to the players 102 with the targeted damage per match score may be associated with the damage per match score of each of the players 102. The gameplay data 122 and the corresponding damage per match score serves as the training data for training the performance model. In example embodiments, this training data may be associated with the particular character/avatar and/or the particular client device type for which the performance model is to be generated. At block 530, the performance model type may be determined as a random forest model. Additionally, the parameters for the random forest model, such as the number of trees, maximum number of features per tree, maximum number of nodes per tree, maximum number of terminal nodes, etc., may be determined. At block 540, the performance model may be generated by training the random forest model on the model training data according to the performance model parameters to predict damage per match score.

At block 550, the model accuracy of the performance model may be determined by using the newly generated performance model to predict the damage per match score for additional players using their gameplay data 122, where the actual damage per match score of these players 102 is known. Additionally, a mean-squared error (MSE) may be determined using the predicted damage per match and the actual damage per match score. At block 560, it may be determined if the MSE is less than a threshold level. If the MSE is less than a threshold level, then the performance model may be determined to have an acceptable level of predictive capability, and at block 570, the performance model may be deployed to predict actions that would improve a player's damage per match score. The game coaching system(s) 110 may store the performance model in the game performance model datastore 114. The performance model may be stored in association with the particular character/avatar and/or the particular client device type to which it pertains. However, if at block 560, it is determined that the MSE is not within an acceptable threshold, then at block 530, the parameters of the performance model training may be modified and/or additional training data may be used to retrain the performance model.

Figure 6:
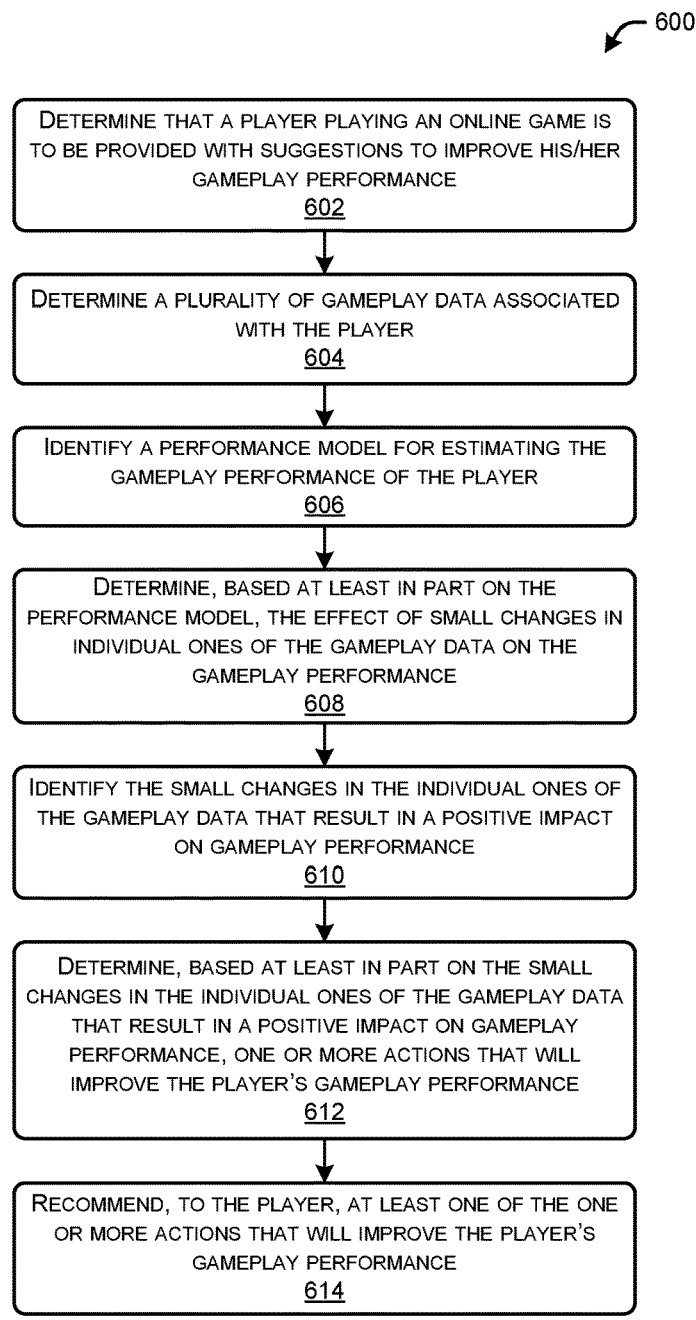
FIG. 6 illustrates a flow diagram of an example method by which one or more actions may be recommended to a player to improve his or her gameplay performance, in accordance with example embodiments of the disclosure.

FIG. 6 illustrates a flow diagram of an example method by which one or more actions may be recommended to a player to improve his or her gameplay performance, in accordance with example embodiments of the disclosure. The method 600 may be performed by the game coaching system(s) 110, in cooperation with one or more entities of environment 100.

At block 602, it may be determined that a player playing an online game is to be provided with suggestions to improve his or her gameplay performance. In some cases, this player 102, who is identified as potentially benefiting from action recommendations for improved gameplay, may be at a beginner or intermediate level, in example embodiments. In other example embodiments, the player 102 identified as potentially benefiting from action recommendations for improved gameplay may be a player 102 whose performance, as indicated by their player performance data 124, may have stagnated over time and/or recently. The player's proficiency level and/or performance changes over time may be determined from the player's player performance data 124, as can be accessed from the player profile datastore 112.

At block 604, a plurality of gameplay data associated with the player may be determined. This gameplay data 122 may include a variety of parameters indicating the type of gameplay data, as well as values corresponding to those parameters. The parameters of the gameplay data 122 may indicate statistical representations of how the player 102 plays the online game. For example, in the context of a battle royale style game, the parameters may include number of weapons used, types of weapons used, weapon use accuracy, percentage time running, number of communications with teammates, etc. In some cases, the parameters may represent the corresponding player's gameplay over a predetermined period of time and/or a predetermined number of sessions. For example, a number of times a shotgun is fired during gameplay may be an average number of times the shotgun is fired over the past two weeks of the corresponding player playing the online game. As another example, the percentage of time the player 102 is moving during gameplay (e.g., the avatar of the player 102 is moving in the online game) may be the average percentage of time the player 102 is moving over the past 30 gameplay sessions.

At block 606, a performance model for estimating the gameplay performance of the player may be identified. As discussed herein, there may be a variety of performance models associated with each online game. For example, there may be a separate performance model for different types of client devices 104 (e.g., smartphone, laptop, game machine, etc.), different game characters and/or avatars, and/or different performance metrics (score, kills, wins minus losses, etc.). In other cases, there may only be a single performance model associated with a particular online game. When there are multiple performance models associated with an online game, the appropriate performance model may be selected corresponding to the player's avatar, performance metric to be modeled, and/or client device type. The game coaching system(s) 110 may retrieve the performance model from the game performance model datastore 114.

At block 608, based at least in part on the performance model, the effects of small changes in individual ones of the gameplay data may be determined. In other words, a particular parameter of the gameplay data 122 may be perturbed from its baseline level and used to predict a change in the performance metric of the player performance data 124 that is to be improved for the player 102. In some cases, the perturbation may be symmetric, where the parameter value being tested may be increased by the same amount by which it is decreased to study the effect of increasing or decreasing that parameter value. In other cases, the perturbation may not be symmetric, where the parameter value being tested may be increased by a different amount than by which it is decreased to study the effect of increasing or decreasing that parameter value. Each of the parameter values that are to be tested may be perturbed and then applied to the performance model, with all other parameter values unchanged for their base levels, to study the effects of changing each of the parameter values. This procedure may also be referred to as a sensitivity analysis.

At block 610, the small changes in the individual ones of the gameplay data that result in a positive impact on gameplay performance may be identified. Thus, the perturbations that are predicted to result in an improvement in the player's gameplay are identified based at least in part on the determination of the effects of small changes in the value of each of the parameters of the gameplay data 122 of the player 102.

At block 612, one or more actions that may improve the player's gameplay performance may be determined based at least in part on the small changes in the individual ones of the gameplay data that result in a positive impact on gameplay performance. These actions may be determined based at least in part on the direction of perturbation of a particular parameter of the gameplay data 122 that are predicted to improve the player's performance. For example, if it is determined that the upward perturbation of the number of grenades thrown during gameplay is likely to improve gameplay performance, then the associated action to recommend to the player 102 may be to increase the number of grenades thrown during gameplay.

At block 614, at least one of the one or more actions that will improve the player's gameplay performance may be recommended to the player. This process may involve sending an indication of the one or more actions to the player's client device 104 to be displayed to the player 102. In example embodiments, the recommendation(s) made to the player 102 may also be logged, such as part of the player recommendation data 128 associated with the player 102 in the player gaming data 120. In example embodiments, the actions that have the greatest impact (e.g., the most improvement in the performance metric) may be presented to the player 102.

In example embodiments, the one or more actions may embody various levels of aggregation or stratification. For example, one suggestion may be to "use more X pings" which may be a more specific suggestion than to communicate more with teammates. Thus, there may be different ways to present the recommendation to users, such as by grouping elements of the specific recommendations and/or using dimensional reduction techniques to provide a more generalized recommendation (e.g., "communicate more," rather than "send more X pings").

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
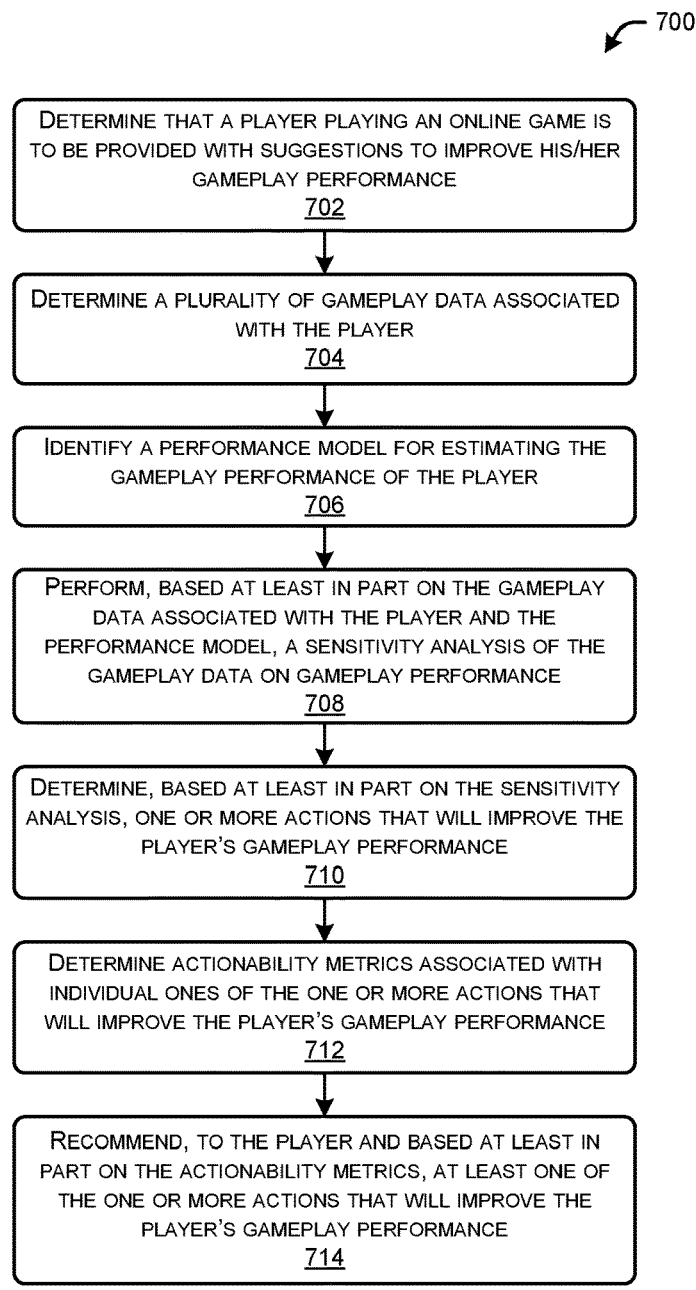
FIG. 7 illustrates a flow diagram of an example method by which one or more actions may be recommended to a player to improve his or her gameplay performance based on actionability metrics, in accordance with example embodiments of the disclosure.

FIG. 7 illustrates a flow diagram of an example method 700 by which one or more actions may be recommended to a player to improve his or her gameplay performance based on actionability metrics, in accordance with example embodiments of the disclosure. The method 700 may be performed by the game coaching system(s) 110, in cooperation with one or more entities of environment 100.

At block 702, it may be determined that a player playing an online game is to be provided with suggestions to improve his or her gameplay performance. In some cases, this player 102, who is identified as potentially benefiting from action recommendations for improved gameplay, may be at a beginner or intermediate level, in example embodiments. In other example embodiments, the player 102 identified as potentially benefiting from action recommendations for improved gameplay may be a player 102 whose performance, as indicated by his or her player performance data 124, may have stagnated over time and/or recently. The player's proficiency level and/or performance changes over time may be determined from the player's player performance data 124, as can be accessed from the player profile datastore 112.

At block 704, a plurality of gameplay data associated with the player may be determined. This gameplay data 122 may include a variety of parameters indicating the type of gameplay data, as well as values corresponding to those parameters. The parameters of the gameplay data 122 may indicate statistical representations of how the player 102 plays the online game. For example, in the context of a basketball simulation game, the parameters may include number of field goal attempts, number of three pointer attempts, number of rebounds, number of assists, field goal percentage, etc. In some cases, the parameters may represent the corresponding player's gameplay over a predetermined period of time and/or a predetermined number of sessions. For example, a number of three pointer attempts may be an average number of three pointer attempts over the past month of the corresponding player playing the online game. As another example, the number of rebounds the player 102 is making during gameplay (e.g., the avatar of the player 102 is making rebounds) may be the average number of rebounds per game the player 102 is making over the past 10 gameplay sessions.

At block 706, a performance model for estimating the gameplay performance of the player may be identified. As discussed herein, there may be a variety of performance models associated with each online game. For example, there may be a separate performance model for different types of client devices 104 (e.g., smartphone, laptop, game machine, etc.), different game characters and/or avatars, and/or different performance metrics (score, kills, wins minus losses, etc.). In other cases, there may only be a single performance model associated with a particular online game. When there are multiple performance models associated with an online game, the appropriate performance model may be selected corresponding to the player's avatar, performance metric to be modeled, and/or client device type. The game coaching system(s) 110 may retrieve the performance model from the game performance model datastore 114.

At block 708, based at least in part on the gameplay data and the performance model, a sensitivity analysis may be performed of the gameplay data on the gameplay performance. To perform the sensitivity analysis, a particular parameter of the gameplay data 122 may be perturbed from its baseline level and used to predict a change in the performance metric of the player performance data 124 that is to be improved for the player 102. In some cases, the perturbation may be symmetric, where the parameter value being tested may be increased by the same amount by which it is decreased to study the effect of increasing or decreasing that parameter value. In other cases, the perturbation may not be symmetric, where the parameter value being tested may be increased by a different amount than by which it is decreased to study the effect of increasing or decreasing that parameter value. Each of the parameter values that are to be tested may be perturbed and then applied to the performance model, with all other parameter values unchanged for their base levels, to study the effects of changing each of the parameter values.

At block 710, one or more actions that may improve the player's gameplay performance may be determined based at least in part on the sensitivity analysis. These actions may be determined based at least in part on the direction of perturbation of a particular parameter of the gameplay data 122 that are predicted to improve the player's performance. For example, if it is determined that the upward perturbation of the number of passes attempted on third down during gameplay is likely to improve gameplay performance, then the associated action to recommend to the player 102 may be to increase the number of passes thrown on third down during gameplay.

At block 712, actionability metrics associated with individual ones of the one or more actions that will improve the player's gameplay performance may be determined. The actionability metric may indicate the relative ease for the player 102 of implementing individual ones of the one or more actions that may improve the player's gameplay performance. For example, skill-based actions (e.g., improve accuracy, improve speed, etc.) may be more difficult to improve for a player 102 than more simple implementations of actions (e.g., more shooting, less walking, etc.). The ease of implementing an action may be quantified by any suitable mechanism and/or scale. For example, a 1 to 100 scale, where 1 is easy and 100 is hard may be used. Alternatively, a 0 to 10 scale, where 0 is hard and 1 is easy, may be used. In some cases, the actionability metrics associated with potential action may be stored in association with the action, such as in a look-up table stored in memory and/or storage of the game coaching system(s) 110. In example embodiments, the actionability metrics may be determined based at least in part on prior recommendations to players 102. For example, recommendations that were made to other players 102 that were effectively implemented by those players 102 may result in an indication of easier implementation in the actionability metric, while other recommendations that were not implemented effectively or took other players 102 additional time to implement may be indicated as a harder implementation in the actionability metric.

At block 714, at least one of the one or more actions that will improve the player's gameplay performance may be recommended to the player based at least in part on the actionability metrics. Thus, the action recommendations that may be made by method 700 may be based not only on the impact of an action, but also on the actionability or the ease of implementation of that action. This process may involve sending an indication of the one or more actions to the player's client device 104 to be displayed to the player 102. In example embodiments, the recommendation(s) made to the player 102 may also be logged, such as part of the player recommendation data 128 associated with the player 102 in the player gaming data 120. As described herein, the recommendations made to the player 102 may at any suitable level of granularity and/or level of aggregation (e.g., "move more" versus "run more" or "walk more").

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
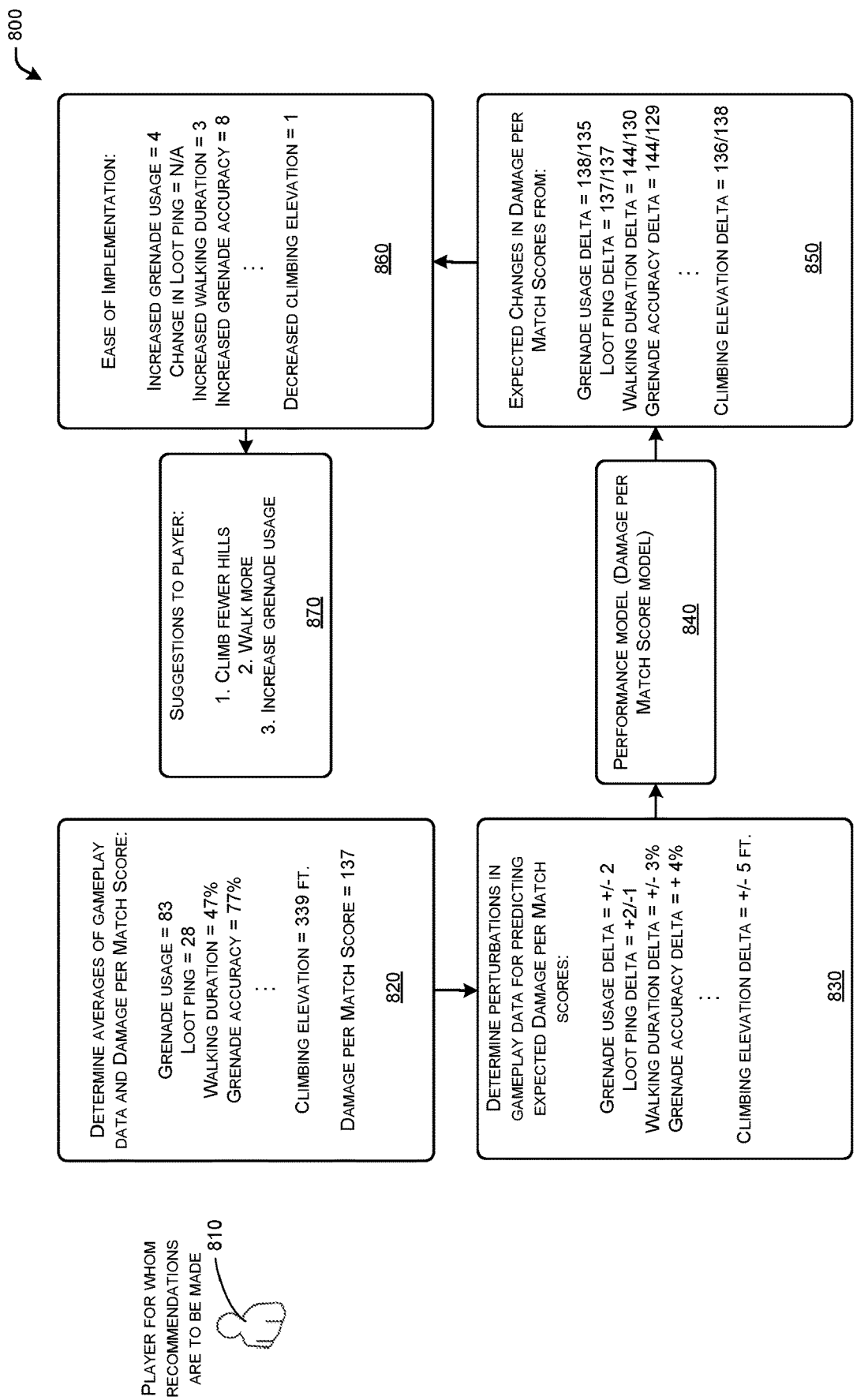
FIG. 8 illustrates a schematic diagram of an example environment in which a performance model is deployed and used to make specific recommendations to a player to improve his or her gameplay, in accordance with example embodiments of the disclosure.

FIG. 8 illustrates a schematic diagram of an example environment 800 a performance model is deployed and used to make specific recommendations to a player to improve his or her gameplay, in accordance with example embodiments of the disclosure. A player 810 may be identified as to be provided with recommendation to improve his or her gameplay of an online game. At block 820, a variety of gameplay data 122 of the player 810 may be determined. This gameplay data 122 may provide statistical indications of the player's gaming characteristics over a certain period of time. For example, the player 810, during gameplay, may use 83 grenades on average, and may loot ping 28 times on average, etc. At block 830, perturbations to the player's gameplay data may be determined. These perturbations may be predetermined in some embodiments. In other cases, these perturbations may be determined from the player's gameplay data 122. In yet other cases, the perturbations may be defined by an operator overseeing and/or conducting this analysis. The perturbations may represent the magnitude that each of the parameters of the gameplay data 122 may be changed from the player's baseline values to determine an effect on player performance data 124. Although in this example, the perturbations are symmetric, it should be understood that the perturbations in other examples may not be symmetric.

The perturbed gameplay data 122 and the parameters thereof, as shown, may be applied to the performance model, which in this case (e.g., in a battle royale game) may be to predict a damage per match score as the performance metric.

For each parameter of the gameplay data 122, a lower end value reduced from baseline value by the corresponding perturbation value may be applied to the performance model, as well as an upper end value increased from baseline value by the corresponding perturbation value, while all of the other parameter values are held the same. For example, the performance model may be used to determine for this player 810, what the effect of him or her using 85 grenades (e.g., baseline 83 grenades plus perturbation value 2 grenades) is predicted to be and what the effect of him or her using 81 grenades (e.g., baseline 83 grenades plus perturbation value 2 grenades) is predicted to be, while each of the other parameters of the gameplay data 122 are held at the baseline values for the player 810. This process may be repeated for each of the gameplay data 122 parameters and for each perturbation to be tested on each of the gameplay data 122 parameters.

At block 850, the expected damage per match scores may be determined from the performance model and the application of the perturbations from the baseline values to the performance model to perform the sensitivity analysis. This sensitivity analysis may indicate the damage per match score expected if the player was to play the online game according to each of the perturbed gameplay data values. From these predictions of the damage per match scores, it can be determined which particular perturbations to which particular gameplay data 122 parameters result in improvements in the player's damage per match score over his or her baseline score of 137. For example, it can be seen that increasing grenade usage is predicted to increase the player's damage per match score, while decreasing grenade usage is predicted to decrease the player's damage per match score. In contrast, changing the amount of loot ping, by the player 810, is not expected to affect the player's damage per match score. As can be seen in this example, increasing grenade accuracy may result in the greatest improvement to the player's damage per match score (e.g., an increase from 137 to 144).

At block 860, for each of the perturbed changes in the parameters of the gameplay data 122 of the player 810 that result in an improvement in gameplay performance, the corresponding actions (e.g., increase grenade use, increase walking duration, increase grenade accuracy, decrease climbing elevation, etc.) may be determined. Furthermore, the ease of implementation of each of these actions may be determined. In example embodiments, the ease of implementation levels of each action may be predetermined and saved for access by the game coaching system(s) 110, such as in a look-up table. In other cases, the ease of implementation may be determined based on other factors associated with the player 810, such as how long he or she has been playing the online game. As seen here, it may be determined that the ease of implementing decreased climbing may be relatively easy, as indicated with an ease of implementation value of 1. On the other hand, a skill improvement action of increased grenade accuracy may be much more difficult to implement than decreasing climbing elevation, as indicated with an ease of implementation value of 8. Although particular ease of implementation values and scales are shown here, it should be appreciated that the ease of implementation may be quantified on any suitable scale and/or system (e.g., 1 to 100 scale, where 1 is easy and 100 is hard, 0 to 1 scale where 0 is hard and 1 is easy, etc.).

At block 870, a subset of actions (e.g., three actions) may be suggested to the player 810. This suggestion may be based on both the impact (e.g., the change in damage per match score) expected from an action, as well as the ease of implementation of that action. In this case, even though increasing grenade accuracy is a relatively impactful action, due to its relative difficulty to implement, it may not be one of the three action recommendations made to the player 810. In this case, climbing fewer hills, walking more, and increasing grenade use may be suggested to the player 810 to improve his or her gameplay. In example embodiments, the game coaching system(s) 110 may send indications of these actions to a client device 104 associated with the player 810 for the client device 104 to display these action recommendations to the player 810.

Figure 9:
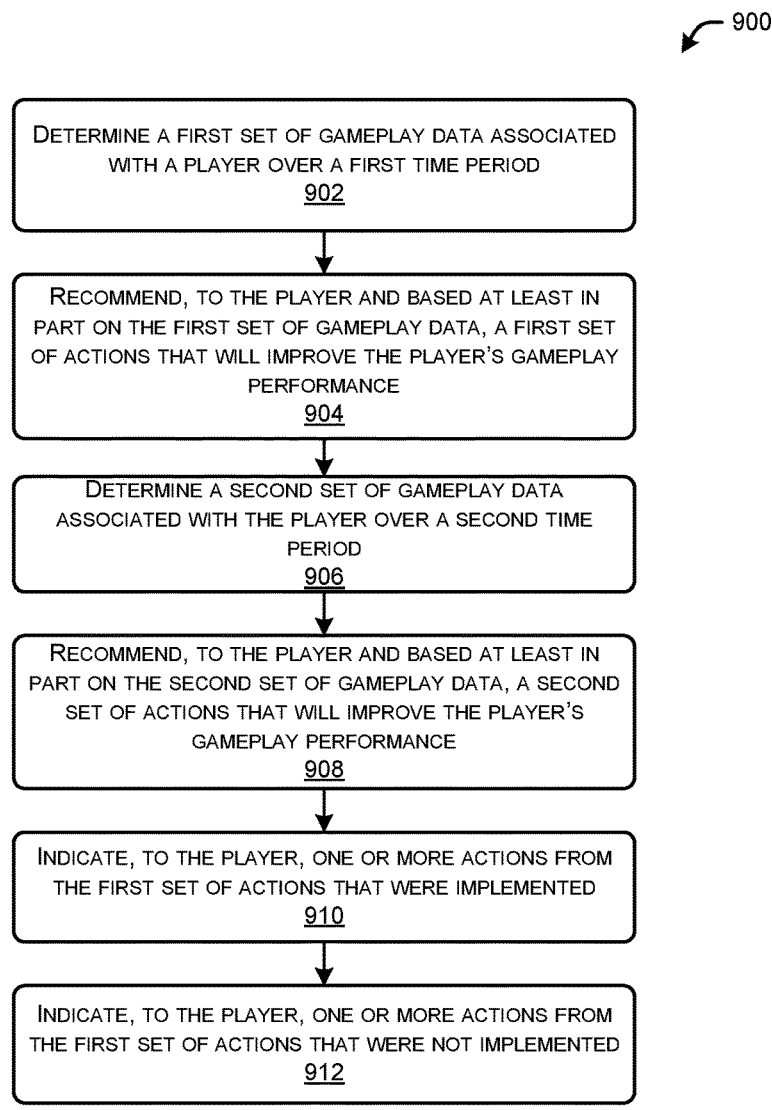
FIG. 9 illustrates a flow diagram of an example method by which recommendations may be made to a player over time, in accordance with example embodiments of the disclosure.

FIG. 9 illustrates a flow diagram of an example method 900 by which recommendations may be made to a player 102 over time, in accordance with example embodiments of the disclosure. The method 900 may be performed by the game coaching system(s) 110, in cooperation with one or more entities of environment 100.

At block 902, a first set of gameplay data associated with a player over a first time period may be determined. This first set of gameplay data 122 may be accessed by the game coaching system(s) 110 from the player profile datastore 112. At block 904, a first set of actions that will improve the player's gameplay performance may be recommended to the player 102 based at least in part on the first set of gameplay data 122. This process may be performed using a performance model, as stored and/or accessed from the game performance model datastore 114. The first set of actions that will improve the player's gameplay performance may be determined by the method 600 of FIG. 6 or the method 700 of FIG. 7.

At block 906, a second set of gameplay data associated with the player over a second time period may be determined. This second set of gameplay data 122 may be accessed by the game coaching system(s) 110 from the player profile datastore 112, and the second time period may be non-overlapping with the first time period in some example embodiments. In alternative embodiments, the first time period and the second time period may be partially overlapping. At block 908, a second set of actions that will improve the player's gameplay performance may be recommended to the player 102 based at least in part on the second set of gameplay data 122. The second set of actions that will improve the player's gameplay performance may be determined by the method 600 of FIG. 6 or the method 700 of FIG. 7.

At block 910, one or more actions from the first set of actions that were implemented may be indicated to the player. This may be performed by determining if the player's gameplay data 122 from the first time period and from the second time period indicate the player 102 increased any of the activities suggested to him or her after the first time period. A log of the player's recommendation may be stored by the game coaching system(s) 110 as the player recommendation data 128 in the player profile datastore 112. If the player 102 implemented any of those activities, then the player 102 may be made aware of those changes in his or her actions that were implemented. In some example embodiments, a score improvement resulting from the player 102 implementing one or more recommended actions may be indicated to the player 102. At block 912, one or more actions from the first set of actions that were not implemented may be indicated to the player. In some cases, activities not implemented may be suggested to the player 102 again. In the same or different cases, activities that were implemented by the player 102 after the first time period may be recommended to the player 102 again, based at least in part on the second sensitivity analysis of blocks 906 and 908. The aforementioned processes can be repeated at a third time period, fourth time period, and so on, to provide the player 102 with updated action recommendations over time.

It will be appreciated that in method 900, a player 102 may be evaluated over time (e.g., the first time period and then again at the second time period). In some cases, the same performance model may be used over time, and in other cases, the performance model may evolve and/or be refined over time. This mechanism may be used to observe how a player 102 may have improved in a specific area over time, and also observe any changes in the performance metric (e.g., damage per match).

It should be noted that some of the operations of method 900 may be performed out of the order presented, with additional elements, and/or without some elements. Some of the operations of method 900 may further take place substantially concurrently and, therefore, may conclude in an order different from the order of operations shown above.

Figure 10:
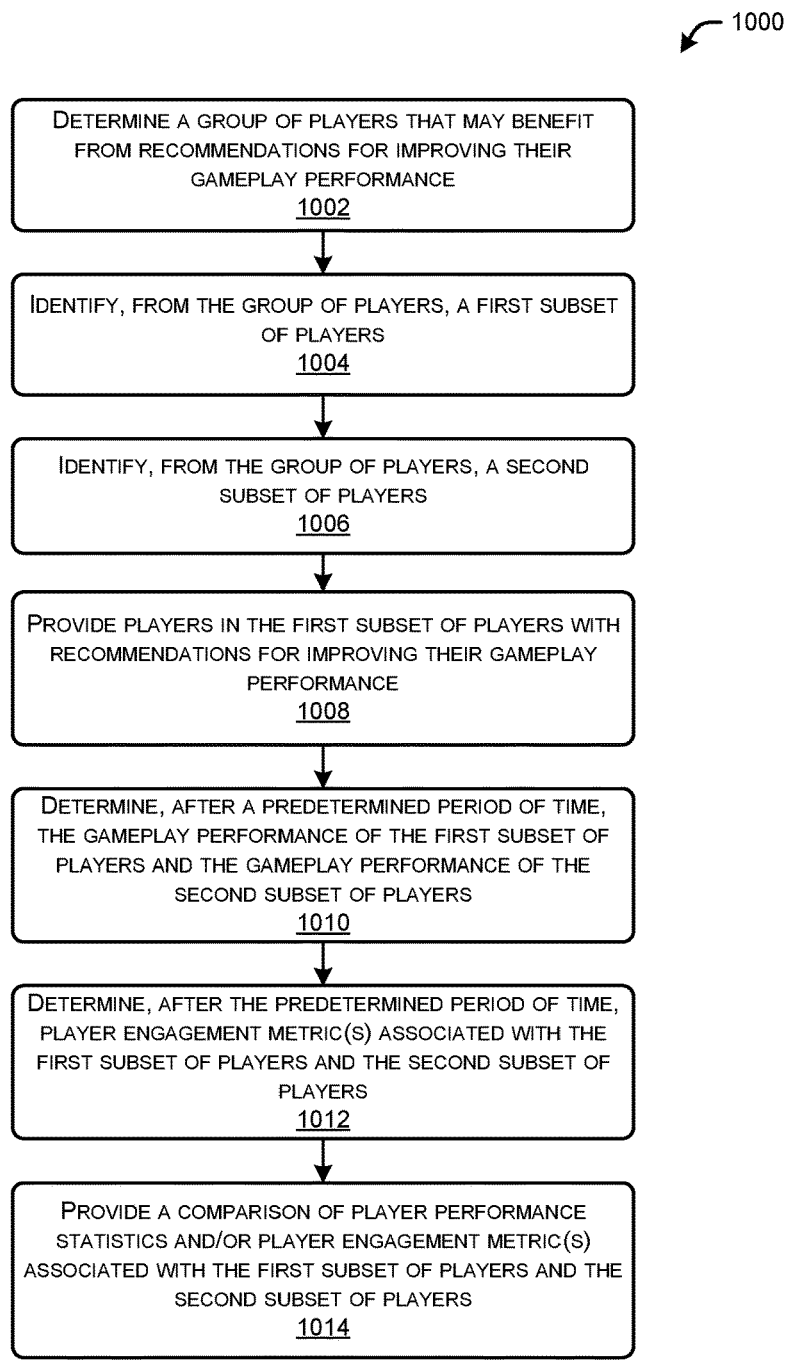
FIG. 10 illustrates a flow diagram of an example method by which player performance and/or player engagement may be examined for players for whom recommendations for improved gameplay were provided versus for players who were not provided with recommendations for improved gameplay, in accordance with example embodiments of the disclosure.

FIG. 10 illustrates a flow diagram of an example method 1000 by which player performance and/or player engagement may be examined for players 102 for whom recommendations for improved gameplay were provided versus for players who were not provided with recommendations for improved gameplay, in accordance with example embodiments of the disclosure. In some cases, this may be referred to an AB test and/or a split test. The method 1000 may be performed by the game coaching system(s) 110, in cooperation with one or more entities of environment 100.

At block 1002, a group of players that may benefit from recommendations for improving their gameplay performance may be determined. In some cases, these players 102, who are identified as potentially benefiting from action recommendations for improvement, may be at a beginner or intermediate level, in example embodiments. In other example embodiments, the players 102 identified as potentially benefiting from action recommendations for improvement may be players 102 whose performance, as indicated by their player performance data 124, may have stagnated over time and/or recently.

At block 1004, a first subset of players may be identified from the group of players. At block 1006, a second subset of players may be identified from the group of players. The first and second subsets of players 102 are non-overlapping. In example embodiments, the entirety of the group of players 102 may be allocated to one of the first subset or the second subset of players 102.

At block 1008, players in the first subset of players may be provided with recommendations for improving their gameplay performance. These recommendations of actions to improve gameplay may be provided by the operations of method 600 and/or method 700, of FIGS. 6 and/or 7, respectively.

At block 1010, after a predetermined period of time, the gameplay performance of the first subset of players and the gameplay performance of the second subset of players may be determined. For example, average scores for the first subset of players 102 and average scores for the second subset of players 102 may be determined.

At block 1012, after the predetermined period of time, player engagement metric(s) associated with the first subset of players and the player engagement metric(s) associated with the second subset of players may be determined. For example, the average number of times players 102 from the first subset of players 102 played the online game over the past week and the average number of times players 102 from the second subset of players 102 played the online game over the past week may be determined based at least in part on the player behavior data 126. At block 1014, a comparison of player performance statistics and/or player engagement metric(s) associated with the first subset of players and the second subset of players may be provided. These comparisons may be used by the operator(s) of the online game to determine if the gameplay coaching helps improve player performance and/or engagement.

In addition to performing an AB analysis, the game coaching system(s) 110 may also perform a longitudinal analysis in some example embodiments. In other words, the game coaching system(s) 110 may be configured to determine if a player 102 becomes more engaged and/or improves his or her performance at a greater rate after he or she is provided with action recommendations for improving his or her gameplay performance compared to a time period before he or she was provided with the action recommendations.

It should be noted that some of the operations of method 1000 may be performed out of the order presented, with additional elements, and/or without some elements. Some of the operations of method 1000 may further take place substantially concurrently and, therefore, may conclude in an order different from the order of operations shown above.

Figure 11:
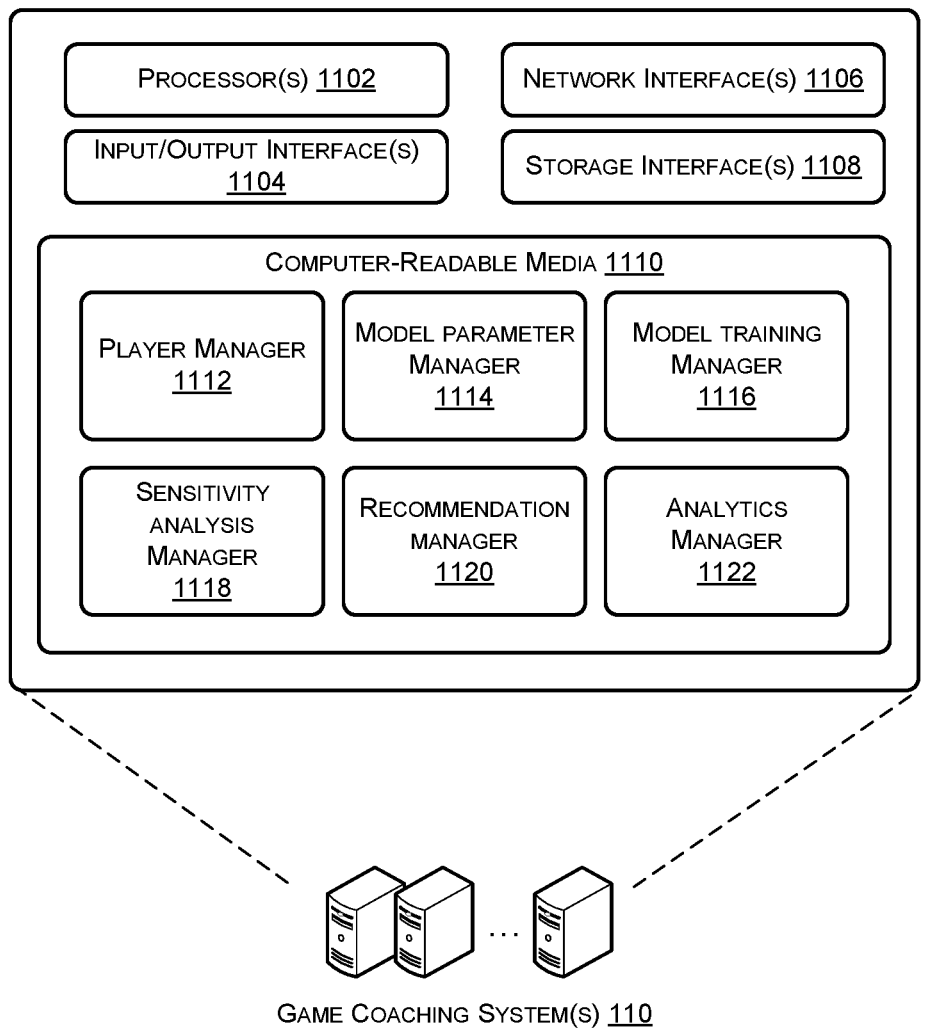
FIG. 11 illustrates a block diagram of example game coaching system(s) that may provide recommendations to players for improving their gameplay, in accordance with example embodiments of the disclosure.

FIG. 11 illustrates a block diagram of example game coaching system(s) 110 that may provide action recommendations for online games for improving one's gameplay performance, in accordance with example embodiments of the disclosure. The game coaching system(s) 110 may include one or more processor(s) 1102, one or more input/output (I/O) interface(s) 1104, one or more network interface(s) 1106, one or more storage interface(s) 1108, and computer-readable media 1110.

In some implementations, the processors(s) 1100 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1100 may possess its own local memory, which also may store program modules, program data, and/or one or more operating system(s). The one or more processor(s) 1100 may include one or more cores.

The one or more input/output (I/O) interface(s) 1104 may enable the game coaching system(s) 110 to detect interaction with a user and/or other system(s), such as one or more online gaming system(s) 130 and/or client devices 104. The I/O interface(s) 1104 may include a combination of hardware, software, and/or firmware and may include software drivers for enabling the operation of any variety of I/O device(s) integrated on the game coaching system(s) 110 or with which the game coaching system(s) 110 interacts, such as displays, microphones, speakers, cameras, switches, input devices, and/or any other variety of sensors, or the like.

The network interface(s) 1106 may enable the game coaching system(s) 110 to communicate via the one or more network(s). The network interface(s) 1106 may include a combination of hardware, software, and/or firmware and may include software drivers for enabling any variety of protocol-based communications, and any variety of wireline and/or wireless ports/antennas. For example, the network interface(s) 1106 may comprise one or more of a cellular radio, a wireless (e.g., IEEE 802.1x-based) interface, a Bluetooth® interface, and the like. In some embodiments, the network interface(s) 1106 may include radio frequency (RF) circuitry that allows the game coaching system(s) 110 to transition between various standards. The network interface(s) 1106 may further enable the game coaching system(s) 110 to communicate over circuit-switch domains and/or packet-switch domains.

The storage interface(s) 1108 may enable the processor(s) 1102 to interface and exchange data with the computer-readable medium 1110, as well as any storage device(s) external to the game coaching system(s) 110, such as the player profile datastore 112 and/or the game performance model datastore 114.

The computer-readable media 1110 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1110 may be implemented as computer-readable storage media (CRSM), which may be any available physical media accessible by the processor(s) 1102 to execute instructions stored on the memory 1110. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 1102. The computer-readable media 1110 may have an operating system (OS) and/or a variety of suitable applications stored thereon. The OS, when executed by the processor(s) 1102 may enable management of hardware and/or software resources of the game coaching system(s) 110.

Several functional blocks having instruction, data stores, and so forth may be stored within the computer-readable media 1110 and configured to execute on the processor(s) 1102. The computer readable media 1110 may have stored thereon a player manager 1112, a model parameter manager 1114, a model training manager 1116, a sensitivity analysis manager 1118, a recommendation manager 1120, and an analytics manager 1122. It will be appreciated that each of the functional blocks 1112, 1114, 1116, 1118, 1120, 1122, may have instructions stored thereon that when executed by the processor(s) 1102 may enable various functions pertaining to the operations of the game coaching system(s) 110.

The instructions stored in the player manager 1112, when executed by the processor(s) 1102, may configure the game coaching system(s) 110 to manage player 102 accounts for accessing online games, such as online games hosted by the online gaming system(s) 130. The player manager 1112 may include instructions that allow tracking player gaming data 120 pertaining to each player 102, storing player gaming data 120 and access that player gaming data 120. The tracking and/or updating player gaming data 120 may be performed in cooperation with one or more other entities, such as the online gaming system(S) 130 and/or client devices 104.

The instructions stored in the model parameter manager 1114, when executed by the processor(s) 1102, may configure the game coaching system(s) 110 to determine, such as by user input, one or more parameters associated with training a performance model, such as a performance model in the form of a random forest. For example, in the context of a random forest model, the processor(s) 1102 may be configured to determine such parameters as the number of trees, maximum number of features per tree, maximum number of nodes per tree, maximum number of terminal nodes, etc. Other types of models may have other parameters for training and/or fitting that may be determined by the processor(s) 1102.

The instructions stored in the model training manager 1116, when executed by the processor(s) 1102, may configure the game coaching system(s) 110 to train the performance model using any variety of parameters for the training. In some cases, the learning may be supervised and in other cases, the learning may be unsupervised or a combination of supervised and unsupervised. The processor(s) 1102 may also be configured to bin the training data to use part of the training data to train the performance model and used the rest of the training data to evaluate the predictive capability of the performance model. The processor(s) 1102 may use any suitable metrics, such as mean squared error (MSE), to evaluate the predictive capabilities of the performance model. In some cases, multiple performance models may be generated for an online game, such as corresponding to different client device types, different characters in the online game, and/or different performance metrics.

The instructions stored in the sensitivity analysis manager 1118, when executed by the processor(s) 1102, may configure the game coaching system(s) 110 to identify parameters of gameplay data 124 of a player 102 that is to be used to perform a sensitivity analysis. The processor(s) 1102 may identify the magnitude of perturbation of the parameters to be tested, such as to the upside and to the downside. The processor(s) 1102 may be configured to manage the perturbation levels, such as by storing the perturbation levels corresponding to different parameters of the gameplay data 122 in computer-readable media 1110 or in other storage locations.

The instructions stored in the recommendation manager 1120, when executed by the processor(s) 1102, may configure the game coaching system(s) 110 to identify actions to recommend to a player 102 based on the impact of that action and/or the ease of implementation of that action. To this end, the processor(s) 1102 may manage and/or store, such as in the computer-readable media 1110, the ease of implementation metric associated with each of the actions that may be recommended. The processor(s) 1102 may further be configured to manage and/or store the recommendations made to a player 102 over time, such as in the player's player recommendation data 128 as part of the player gaming data 120 of that player 102.

The instructions stored in the analytics manager 1122, when executed by the processor(s) 1102, may configure the game coaching system(s) 110 to access player performance data 124 and/or player behavior data 126 to determine if players 102 who are provided with action recommendations, do indeed show an improvement in their performance and/or in their engagement. Additionally, the processor(s) 1102 may be configured to determine if a player 102 becomes more engaged and/or improves his or her performance at a greater clip after he or she is provided with action recommendations for improving his or her gameplay performance.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more computer-readable media storing computer-executable instructions that, when executed by the one or more processors, cause the one or more processors to:
   identify a value of a parameter of a set of gameplay data corresponding to a player associated with an online game on which to perform a sensitivity analysis;
   perform, using a performance model, the value of the parameter, and a perturbation of the parameter, the sensitivity analysis, wherein the performance model is trained to predict predicted values of a performance metric associated with the online game for input gameplay data;
   determine, based at least in part on the sensitivity analysis, that the perturbation to the value is expected to improve the performance metric corresponding to the player from a baseline level of the performance metric to an improved level of the performance metric;
   identify an action corresponding to the perturbation of the value of the parameter; and
   recommend, to the player, the action to improve over the baseline level of the performance metric.

2. The system of claim 1, wherein the computer-executable instructions further cause the one or more processors to:
   train the performance model based at least in part on a training set of gameplay data corresponding to individual ones of a plurality of players associated with the online game and player performance data of the plurality of players, the player performance data corresponding to the performance metric associated with the online game.

3. The system of claim 2, wherein to train the performance model, the computer-executable instructions further cause the one or more processors to:
   identify a model type of the performance model; and
   identify one or more training parameters values associated with the model type of the performance model.

4. The system of claim 1, wherein the computer-executable instructions further cause the one or more processors to:
   determine, based at least in part on the set of gameplay data, that the player is to be provided with one or more recommendations to improve gameplay of the online game.

5. The system of claim 1, wherein to perform the sensitivity analysis, the computer-executable instructions further cause the one or more processors to:
   determine another value of the parameter by increasing the value by the perturbation;
   predict, based at least in part on the performance model and the other value of the parameter, the improved level of the performance metric; and
   determine that the improved level is greater than the baseline level.

6. The system of claim 1, wherein the computer-executable instructions further cause the one or more processors to:
determine, based at least in part on the sensitivity analysis, that another perturbation to another value of another parameter of the set of gameplay data is expected to improve the performance metric corresponding to the player from the baseline level of the performance metric to another level of the performance metric;
identify another action corresponding to the other perturbation of the other value of the other parameter;
identify an ease of implementation value corresponding to the action and another ease of implementation value corresponding to the other action; and
determine, based at least in part on the ease of implementation value and the other ease of implementation value, that the action is to be recommended to the player.

7. The system of claim 1, wherein the set of gameplay data is associated with a time period, and wherein the computer-executable instructions further cause the one or more processors to:
determine another set of gameplay data corresponding to the player, the other set of gameplay data associated with another time period different from the time period;
identify another value of another parameter of the other set of gameplay data on which to perform another sensitivity analysis, the other sensitivity analysis based at least in part on another perturbation of the other parameter;
perform, using the performance model, the other value of the other parameter, and the other perturbation of the other parameter, the other sensitivity analysis;
determine, based at least in part on the other sensitivity analysis, that the other perturbation to the other value is expected to improve the performance metric corresponding to the player from another baseline level of the performance metric to another level of the performance metric;
identify another action corresponding to the other perturbation of the other value of the other parameter; and
recommend, to the player, the other action to improve over the other baseline level of the performance metric.

8. The system of claim 7, wherein the computer-executable instructions further cause the one or more processors to:
determine, based at least in part on the other set of gameplay data, that the player had performed the action;
estimate, based at least in part on the performance model, a level of improvement in the performance metric due to the player performing the action; and
indicate, to the player, the level of improvement in the performance metric due to performing the action.

9. The system of claim 1, wherein the computer-executable instructions further cause the one or more processors to:
determine another set of gameplay data corresponding to another player;
identify another value of the parameter of the other set of gameplay data on which to perform another sensitivity analysis, the other sensitivity analysis based at least in part on the perturbation of the parameter;
perform, using the performance model, the other value of the parameter, and the perturbation of the parameter, the sensitivity analysis;
determine, based at least in part on the other sensitivity analysis, that the perturbation to the other value is expected to reduce the performance metric corresponding to the other player from another baseline level of the performance metric to another improved level of the performance metric; and
determine that the action is not to be recommended to the other player.

10. A computer-implemented method, comprising:
identifying a value of a parameter of a set of gameplay data corresponding to a player associated with an online game on which to perform a sensitivity analysis;
performing, using a performance model, the value of the parameter, and a perturbation of the parameter, the sensitivity analysis, wherein the performance model is trained to predict predicted values of a performance metric associated with the online game for input gameplay data;
determining, based at least in part on the sensitivity analysis, that the perturbation to the value is expected to improve the performance metric corresponding to the player from a baseline level of the performance metric to an improved level of the performance metric;
identifying an action corresponding to the perturbation of the value of the parameter; and
recommending, to the player, the action to improve over the baseline level of the performance metric.

11. The computer-implemented method of claim 10, wherein performing the sensitivity analysis further comprises:
determining another value of the parameter by increasing the value by the perturbation;
predicting, based at least in part on the performance model and the other value of the parameter, the improved level of the performance metric; and
determining that the improved level is greater than the baseline level.

12. The computer-implemented method of claim 10, further comprising:
training the performance model based at least in part on a training set of gameplay data corresponding to individual ones of a plurality of players associated with the online game and player performance data of the plurality of players, the player performance data corresponding to the performance metric associated with the online game.

13. The computer-implemented method of claim 12, wherein training the performance model further comprises:
identifying a model type of the performance model; and
identifying one or more training parameters values associated with the model type of the performance model.

14. The computer-implemented method of claim 12, wherein the online game is a battle royale genre game and the performance metric is a damage per match score.

15. The computer-implemented method of claim 10, wherein the set of gameplay data is associated with a time period, the method further comprising:
determining another set of gameplay data corresponding to the player, the other set of gameplay data associated with another time period different from the time period;
identifying another value of another parameter of the other set of gameplay data on which to perform another sensitivity analysis, the other sensitivity analysis based at least in part on another perturbation of the other parameter;
performing, using the performance model, the other value of the other parameter, and the other perturbation of the other parameter, the other sensitivity analysis;
determining, based at least in part on the other sensitivity analysis, that the other perturbation to the other value is expected to improve the performance metric corresponding to the player from another baseline level of the performance metric to another level of the performance metric;

identifying another action corresponding to the other perturbation of the other value of the other parameter; and recommending, to the player, the other action to improve over the other baseline level of the performance metric.

16. The computer-implemented method of claim 10, wherein recommending the action to improve over the baseline level of the performance metric further comprises sending, to a client device associated with the player, an indication of the action.

17. One or more computer-readable media storing computer-executable instructions that, when executed by one or more processors, cause the one or more processors to:

identify a value of a parameter of a set of gameplay data corresponding to a player associated with an online game on which to perform a sensitivity analysis;

perform, using a performance model, the value of the parameter, and a perturbation of the parameter, the sensitivity analysis, wherein the performance model is trained to predict predicted values of a performance metric associated with the online game for input gameplay data;

determine, based at least in part on the sensitivity analysis, that the perturbation to the value is expected to improve the performance metric corresponding to the player from a baseline level of the performance metric to an improved level of the performance metric;

identify an action corresponding to the perturbation of the value of the parameter; and recommend, to the player, the action to improve over the baseline level of the performance metric.

18. The one or more computer-readable media of claim 17, wherein the computer-executable instructions further cause the one or more processors to:

training the performance model based at least in part on a training set of gameplay data corresponding to individual ones of a plurality of players associated with the online game and player performance data of the plurality of players, the player performance data corresponding to the performance metric associated with the online game.

19. The one or more computer-readable media of claim 18, wherein to perform the sensitivity analysis, the computer-executable instructions further cause the one or more processors to:

determine another value of the parameter by increasing the value by the perturbation;

predict, based at least in part on the performance model and the other value of the parameter, the improved level of the performance metric; and determine that the improved level is greater than the baseline level.

20. The one or more computer-readable media of claim 17, wherein the computer-executable instructions further cause the one or more processors to:

determine, based at least in part on the sensitivity analysis, that another perturbation to another value of another parameter of the set of gameplay data is expected to improve the performance metric corresponding to the player from the baseline level of the performance metric to another level of the performance metric;

identify another action corresponding to the other perturbation of the other value of the other parameter;

identify an ease of implementation value corresponding to the action and another ease of implementation value corresponding to the other action; and determine, based at least in part on the ease of implementation value and the other ease of implementation value, that the action is to be recommended to the player.

\* \* \* \* \*